United States Patent
Längle et al.

(10) Patent No.: US 11,514,589 B2
(45) Date of Patent: Nov. 29, 2022

(54) METHOD FOR DETERMINING AT LEAST ONE MECHANICAL PROPERTY OF AT LEAST ONE OBJECT

(71) Applicants: FRAUNHOFER-GESELLSCHAFT ZUR FÖRDERUNG DER ANGEWANDTEN FORSCHUNG E.V., Munich (DE); KARLSRUHER INSTITUT FÜR TECHNOLOGIE (KIT), Karlsruhe (DE)

(72) Inventors: Thomas Längle, Eggenstein (DE); Beniamin Noack, Karlsruhe (DE); Florian Pfaff, Karlsruhe (DE); Uwe Hanebeck, Waldbronn (DE); Robin Gruna, Baden-Baden (DE); Georg Maier, Kandel (DE)

(73) Assignees: Fraunhofer-Gesellshaft zur Förderung der angewandten Forschung e.V., Munich (DE); Karlsruber Institut für Technologie, Karlsruhe (DE)

( * ) Notice: Subject to any disclaimer, the term of this patent is extended or adjusted under 35 U.S.C. 154(b) by 58 days.

(21) Appl. No.: 15/733,383

(22) PCT Filed: Jan. 21, 2019

(86) PCT No.: PCT/EP2019/051387
§ 371 (c)(1),
(2) Date: Jul. 16, 2020

(87) PCT Pub. No.: WO2019/141847
PCT Pub. Date: Jul. 25, 2019

(65) Prior Publication Data
US 2020/0388042 A1    Dec. 10, 2020

(30) Foreign Application Priority Data
Jan. 19, 2018 (DE) .................... 10 2018 200 895.7

(51) Int. Cl.
*G06T 7/292* (2017.01)
*B07C 5/342* (2006.01)

(52) U.S. Cl.
CPC ............ *G06T 7/292* (2017.01); *B07C 5/3422* (2013.01); *G06T 2207/20084* (2013.01)

(58) Field of Classification Search
CPC ........... G06T 7/292; G06T 2207/20084; B07C 5/342; B07C 5/3422
See application file for complete search history.

(56) References Cited

U.S. PATENT DOCUMENTS 5,956,413 A * 9/1999 Oste ...................... B07C 5/3425
382/110
6,078,018 A * 6/2000 Davis .................... B07C 5/3422
356/406

(Continued)

FOREIGN PATENT DOCUMENTS

| WO | WO-2015128174 A1 | 9/2015 |
| WO | WO-2017089145 A1 | 6/2017 |

OTHER PUBLICATIONS

"International Application Serial No. PCT/EP2019/051387, International Search Report dated May 6, 2019", (dated May 6, 2019), 2 pgs.

(Continued)

*Primary Examiner* — Syed Haider
(74) *Attorney, Agent, or Firm* — Schwegman Lundberg & Woessner, P.A.

(57) ABSTRACT

The invention relates to a method and a device for determining at least one mechanical property of at least one object, wherein the at least one object is subjected to at least one interaction which influences a movement state of the at least one object, (Continued)

Figure 1:
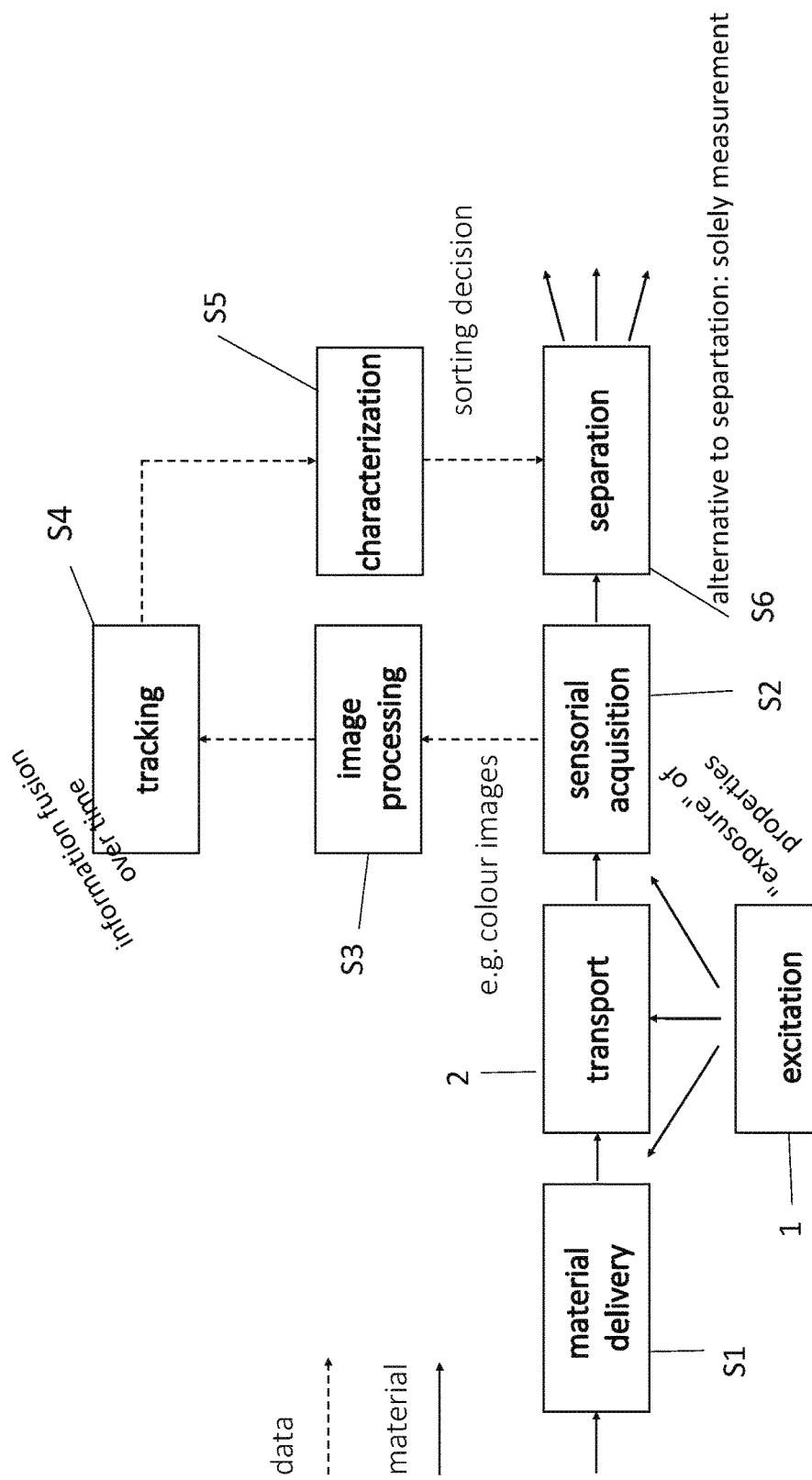

wherein the at least one interaction is selected such that the movement state effectuated by the interaction is a function of the at least one mechanical property,
wherein the at least one object is observed using at least one camera,
wherein the movement state is determined from images recorded by the at least one camera
and wherein the at least one mechanical property of the at least one object is determined from the movement state thus determined.

17 Claims, 7 Drawing Sheets

(56) References Cited

U.S. PATENT DOCUMENTS

| | | | | |
|---|---|---|---|---|
| 2006/0031015 A1* | 2/2006 | Paradie | ............. | G06K 9/00805 |
| | | | | 701/301 |
| 2013/0168301 A1* | 7/2013 | Dell'Endice | ............. | B07C 5/02 |
| | | | | 209/552 |
| 2016/0354809 A1* | 12/2016 | Gruna | ..................... | B07C 5/342 |
| 2018/0211373 A1* | 7/2018 | Stoppa | ................. | G06K 9/4628 |

OTHER PUBLICATIONS

"International Application Serial No. PCT/EP2019/051387, Written Opinion dated May 6, 2019", (dated May 6, 2019), 5 pgs.

Pfaff, Florian, et al., "Improving optical sorting of bulk materials using sophisticated motion models", tm-Technisches Messen, De Gruyter 83.2, (2016), 77-84.

Pfaff, Florian, et al., "TrackSort: Predictive tracking for sorting uncooperative bulk materials", 2015 IEEE International Conference on Multisensor Fusion and Integration for Intelligent Systems (MFI). IEEE, (2015), 7 pgs.

Matthews, Brian W., "Comparison of the predicted and observed secondary structure of T4 phage lysozyme", Biochimica et Biophysica Acta (BBA)-Protein Structure 405.2, (1975), 442-451.

Pieper, Christoph, et al., "Numerical modeling of an automated optical belt sorter using the Discrete Element Method", Powder Technology 301, (2016), 805-814.

* cited by examiner

METHOD FOR DETERMINING AT LEAST ONE MECHANICAL PROPERTY OF AT LEAST ONE OBJECT

PRIORITY APPLICATIONS

This application is a U.S. National Stage Filing under 35 U.S.C. § 371 from International Application No. PCT/EP2019/051387, filed on Jan. 21, 2019, and published as WO2019/141847 on Jul. 25, 2019, which claims the benefit of priority to German Application No. 10 2018 200 895.7, filed on Jan. 19, 2018; the benefit of priority of each of which is hereby claimed herein, and which applications and publication are hereby incorporated herein by reference in their entirety.

The invention relates to a method for determining at least one mechanical property of at least one object, wherein the object is subjected to an interaction which influences a movement state of the object. The object is observed using at least one camera and the movement of the object is determined from the images recorded by the camera. The at least one mechanical property of the object can then be determined therefrom.

Systems for industrial visual inspection represent an important technology for quality assurance in automated production and preparation processes. Subcategories of such systems are optical inspection and sorting systems. Depending on the task, VIS cameras, NIR cameras, dual energy X-ray methods or other sensor systems are used. For complex systems, multiple different sensors are possibly used (multi-sensor systems), to obtain sufficient items of information to characterize the materials. This is generally linked to high costs.

The selection of a suitable sensor system restricts the system with respect to the properties which can be used for the inspection or characterization of the materials. In the case of VIS systems, these are optical properties. In the case of X-ray systems, a physical property can be acquired by the partial density determination, but corresponding systems are very expensive and require the use of extensive radiation protection measures.

In some cases, the mentioned items of information are not sufficient for the evaluation or differentiation of specific materials.

In general, materials may be described by geometrical, optical, biochemical and mechanical-physical properties. However, no systems have existed up to this point which can use the last-mentioned category for characterizing materials.

Non-optical object properties are presently predominantly inspected by mechanical methods. In isolated cases, contactless methods are also used, however, these are very cost-intensive and are therefore often not cost-effectively usable. The determination and evaluation of the density is primarily applied in the recycling field for the separation of different plastics or metals. Above all, float/sink methods are more widespread here. These wet methods require a high facility expenditure and have the significant disadvantage that they are not suitable for moisture-sensitive products (for example foods or pharmaceuticals). Moreover, the liquid bath is often contaminated with pollutants in the context of the waste processing, and so it has to be disposed of complexly. These disadvantages are partially avoided in the case of airflow sorting (also called wind sifting), in which an airflow is used for density sorting. However, this method is only suitable for sorting materials/objects having a large density difference, for example for separating out paper in used glass, and is therefore strongly limited in the application. The inertia of particles is also used as a separation criterion, for example for material separation of used plastics. A separation is performed with the aid of inertial load in inertial separators or centrifugal force separators. However, these are strongly limited in the throughput and are only suitable for relatively small particle sizes. Automatic weighing systems are presently used for monitoring the product weight and/or the mass, which can also be operated for in-line testing in the production process. In general, however, they do not permit the simultaneous inspection of multiple objects and therefore have to be used in parallel for a high throughput.

Established testing and measuring methods do exist for evaluating other non-optical object properties such as friction, rigidity, rolling capacity or flow resistance, but they cannot be implemented directly for processing and facility technology and are therefore only usable for manual off-line inspection. For example, different laboratory measurement setups are presently used for determining coefficients of friction for tribological inspections. An in-line inspection method for the automatic inspection of friction properties in the production process, in particular of bulk goods, presently does not exist, however.

X-ray technology or terahertz technology represents contactless methods, using which items of information can be obtained about the internal composition of objects and which enable inferences of non-optical properties. For example, the density of a material can be measured by means of dual energy X-ray methods. However, both technologies are linked to very high acquisition costs. In addition, extensive radiation protection measures have to be introduced and observed for the use of X-ray technology in production operation. In the case of terahertz technology, there are disadvantages in the low location resolution (due to a scanning image acquisition and the wavelength range used) and the strong absorption of water, which in particular prevents the testing of many foods.

WO 2015/128174 A1 describes the use of cameras in optical bulk material sorting.

The object of the present invention is to provide a cost-effective option to be able to determine at least one mechanical property of at least one object. In particular, those properties of the object which are not optically recognizable are also to be determinable.

The object is achieved by the method for determining at least one mechanical property of at least one object according to claim 1, and the device for determining at least one mechanical property of an object according to claim 18.

The dependent claims specify advantageous refinements of the method according to the invention.

A method is provided according to the invention, using which at least one mechanical property of at least one object is determinable. Mechanical properties are preferably understood here as those properties which have influence on the movement of the object under the influence of at least one interaction. The method according to the invention is advantageously suitable in particular for determining properties which are not optically recognizable.

According to the invention, the at least one object is subjected to at least one interaction, wherein the at least one interaction influences a movement state of the at least one object. In the normal case, the at least one interaction will therefore exert a force on the at least one object. The influencing of the movement state can mean a change of the movement state. However, the influencing can also result in the formation of a force equilibrium, in which the movement state of the object is constant. One example of this is drifting of the object in a viscous medium, where a force equilibrium forms between a force moving the object and a friction force on the object. Another example is holding the object by means of the at least one interaction in the gravitational field, where the object does not move constantly.

The at least one interaction is preferably selected so that the movement state influenced by the interaction is a function of the at least one mechanical property which is to be determined. If the interaction is to effectuate a change of the movement state of the at least one object, i.e., for example, an acceleration of the object, the interaction can thus advantageously be selected so that the change of the movement state effectuated by the interaction is a function of the at least one mechanical property. If the interaction is not to change the movement state of the object, the interaction is thus advantageously selected so that it influences the non-changing movement state of the object, which means that the resulting movement state would be different if the interaction were different. In general terms, the object is preferably subjected to at least one interaction, so that a change of this interaction, in particular a change of a value or amount of this interaction, leads to a change of the movement state of the object or has this as a result. In this case, the interaction can then be selected so that the change of the movement state of the object as a result of a change of the interaction is a function of the at least one mechanical property which is to be determined.

According to the invention, the at least one object is observed using at least one camera while the interaction acts on the object. In this case, the object is to be observed using the camera at least at the times at which the interaction influences the movement state of the object.

A movement of the object is then determined from the images recorded by the at least one camera. It is to be noted that the movement thus observed can also be a standstill of the object, for example if the interaction results in an unmoving equilibrium state.

The at least one mechanical property of the object can then be determined from the movement thus determined of the at least one object. In addition to the observed movement, a knowledge of the at least one interaction is advantageously incorporated in this determination. Further parameters can also be incorporated, which can, inter alia, also be optically determinable, such as for example an extension or a volume of the object. It is possible but not required that the at least one mechanical property of the object is computed from the observed movement. A determination by means of machine learning methods is also comprised by the invention.

Advantageously, at least one location of the object at a specific point in time, at least one trajectory of the object, at least one velocity and/or at least one acceleration of the object can be determined from the images recorded by the camera. Advantageously, multiple images are recorded by the camera, which are incorporated into the determination of the movement state. However, scenarios are also conceivable in which the movement state is determinable using only one image. For example, if the object is held in an inhomogeneous force field in relation to the gravitational field of the Earth, the mass of the object can thus, for example, influence the location of the holding, because this is precisely the location at which the weight force of the object determined by the mass corresponds to the counter force exerted by the inhomogeneous force field. In this case, the mass of the object can therefore be determined from only one image as a mechanical property. However, at least two images are advantageously recorded by the camera.

The object is preferably recorded multiple times at different times by the at least one camera. In this manner, a change of the location of the object can be determined, from which the movement state is determinable.

The object can advantageously also be recorded using at least two cameras from different directions. In this manner, the movement state of at least one object which does not move precisely in parallel to the image plane of a camera can be determined. This is advantageous in particular in scenarios where mechanical properties of a plurality of objects which do not all move in parallel to one another are to be determined simultaneously.

It is also advantageously possible to observe the at least one object using a first camera at a first point in time and using a second camera at a second point in time different from the first. In this manner, the determination of the movement state is not restricted to the field of view of one camera.

In one advantageous design of the invention, a set of variables can be determined as the movement state of the at least one object, which contains one or more of the following variables: a number of values ascertained from the images, an average velocity of the respective object, averaged over a maximum period of time which the object is visible in the recorded images, a minimum velocity within the period of time which the object is visible in the recorded images, a maximum velocity in the period of time in which the object is visible in the recorded images, an average velocity over a part or the entire period of time in which the respective object is visible in the recorded images, an average acceleration of the respective object, averaged over a maximum period of time which the object is in the recorded images, a minimum acceleration within the period of time which the respective object is visible in the recorded images, a maximum acceleration within the period of time which the respective object is visible in the recorded images, and/or an average acceleration over a part of the period of time in which the respective object is visible in the recorded images.

Preferably, above all, those interactions which exert at least one force on the object come into consideration as an interaction. The interaction can advantageously be or comprise, for example, an application of vibrations, an application of at least one impact, an interaction with a contact surface and/or an interaction with an airflow. An interaction with other forces, such as for example with an electrical field and/or a magnetic field, is also possible, wherein a charge of the object is preferably known here. A movement of the object in a liquid flow is also possible, where a friction force is applied to the object as the interaction.

The application of vibrations can be performed, for example, by means of a vibrating table. Other interactions can be exerted, for example, in that the object slides on a slide. The slide can also be designed here as a stepped slide, or as a sandblasted or brushed or coated slide. The object can also be moved using a conveyor belt for the application of the interaction.

Mechanical properties which are determinable using the method according to the invention can in particular be all properties of the object which can have an influence on a movement state of the object. These can be, for example, a mass of the object, a density of the object, a friction of the object with a surrounding medium, such as for example a gas, air, or a liquid, a rolling capacity of the object, an adhesion of the object, a stiffness, a modulus of elasticity, a coefficient of restitution and/or a flow resistance of the object. This list is not to be understood as restrictive, but rather solely specifies those mechanical properties in which the method is particularly advantageously implementable.

According to the invention, the at least one object is observed using at least one camera and the movement state is determined from images recorded by the camera. The images can advantageously be subjected in this case to image correction, segmentation, localization and/or feature computation.

The method according to the invention is particularly advantageously applicable to the determination of mechanical properties of a plurality of objects. The method preferably permits the mechanical properties of a plurality of these objects to be determined jointly. In this case, a plurality of the objects can advantageously be observed simultaneously by the at least one camera, so that the movement state of a plurality of the objects can also be determinable at the same times.

Advantageously, at least some of the at least one objects are identified and tracked or followed in different images recorded by the camera. Such tracking can be performed, for example, by means of multi-object tracking and/or by means of extended object tracking. If the method is only applied to one object simultaneously, the tracking of the object is nonetheless advantageous to be able to identify it in different images. The mentioned tracking methods also permit, however, the simultaneous tracking of a plurality of objects and in particular the association and/or identification of the individual objects in different images, so that the movement states of multiple objects can also be determined in parallel over multiple images.

In one advantageous design of the invention, the at least one mechanical property can be ascertained from the images recorded by the at least one camera by means of a neural network and/or by means of machine learning. In this case, the neural network can be trained beforehand using one or more objects having known values of the mechanical property to be determined. In this case, the object or objects having the known values of the mechanical property is/are subjected to the interaction to which the objects are subjected later upon the determination of the mechanical properties and the objects are observed in this case using the at least one camera. These images can then be predefined for the neural network and linked to the known mechanical properties.

If images of objects having unknown values of the mechanical property are now recorded in an identically constructed environment, the neural network can thus assign values of the mechanical property to these images. In this manner, the neural network can determine the values of the at least one mechanical property for the objects having unknown values of the mechanical property from the images recorded by the camera.

In one advantageous design of the invention, the movements of the objects can be described by a list of centre-of-gravity measurements.

If the method according to the invention is implemented for a plurality of objects, the objects can thus be classified with the aid of the at least one mechanical property. Objects having identical values or values sufficiently close together of the at least one mechanical property can thus each be assigned to identical fractions. In particular, a sorting step can then advantageously be downstream from the method according to the invention, in which the objects which are to be assigned to different fractions are supplied to different locations.

The method according to the invention can advantageously be supplemented with determinations of at least one geometrical property of the at least one object. For example, if the observation of the movement state permits the determination of the mass of the at least one object, with additional determination of, for example, a diameter of the object, a density of the object can thus be concluded. The at least one geometrical property can advantageously be determined in the images recorded by the camera.

The method according to the invention can advantageously be used for measuring and/or classifying, preferably in an industrial inspection and/or testing system. The method can in particular be used advantageously for in-line testing. The method can effectuate a one hundred percent testing of the material to be tested in this case, i.e. every object is tested. The method according to the invention can thus effectuate a significant advantage in relation to conventional methods, which only enable a spot-check inspection. The method according to the invention can therefore particularly advantageously be part of a manufacturing method.

The method according to the invention can advantageously be used, inter alia, for bulk goods sorting, for example in recycling, and/or for bulk goods testing, for example for testing semifinished products.

The invention is to be explained by way of example hereafter with the aid of several figures. Identical reference signs identify identical or corresponding features here. The features shown in the examples can also be implemented independently from the specific example and can be combined between different examples.

Figure 2:
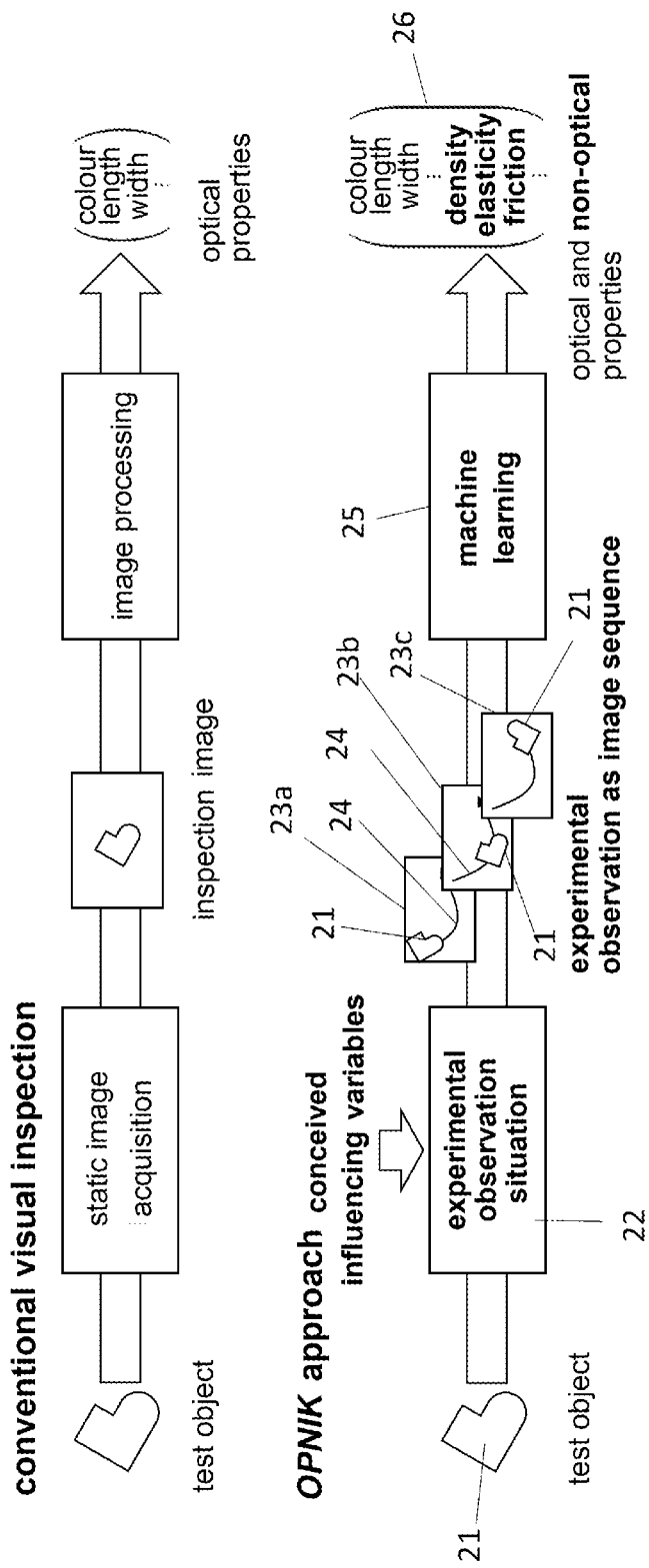
Figure 3:
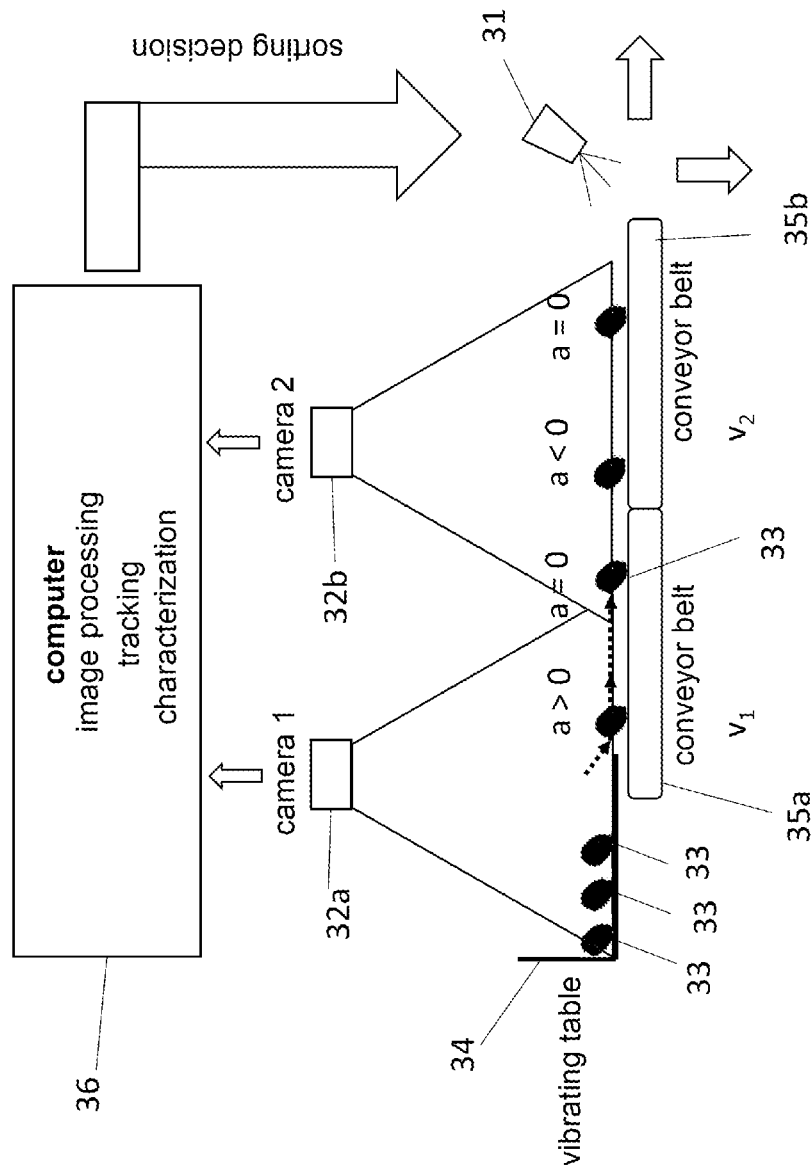
Figure 4:
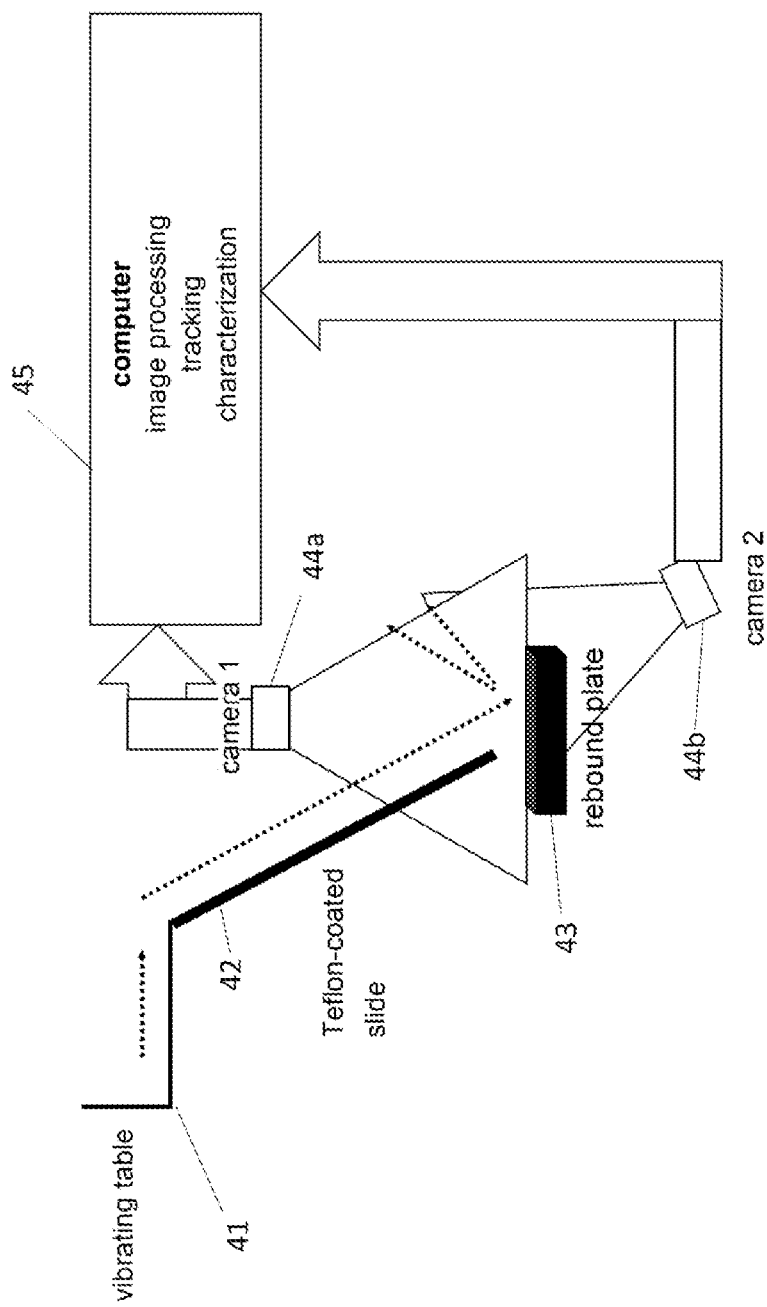
Figure 5:
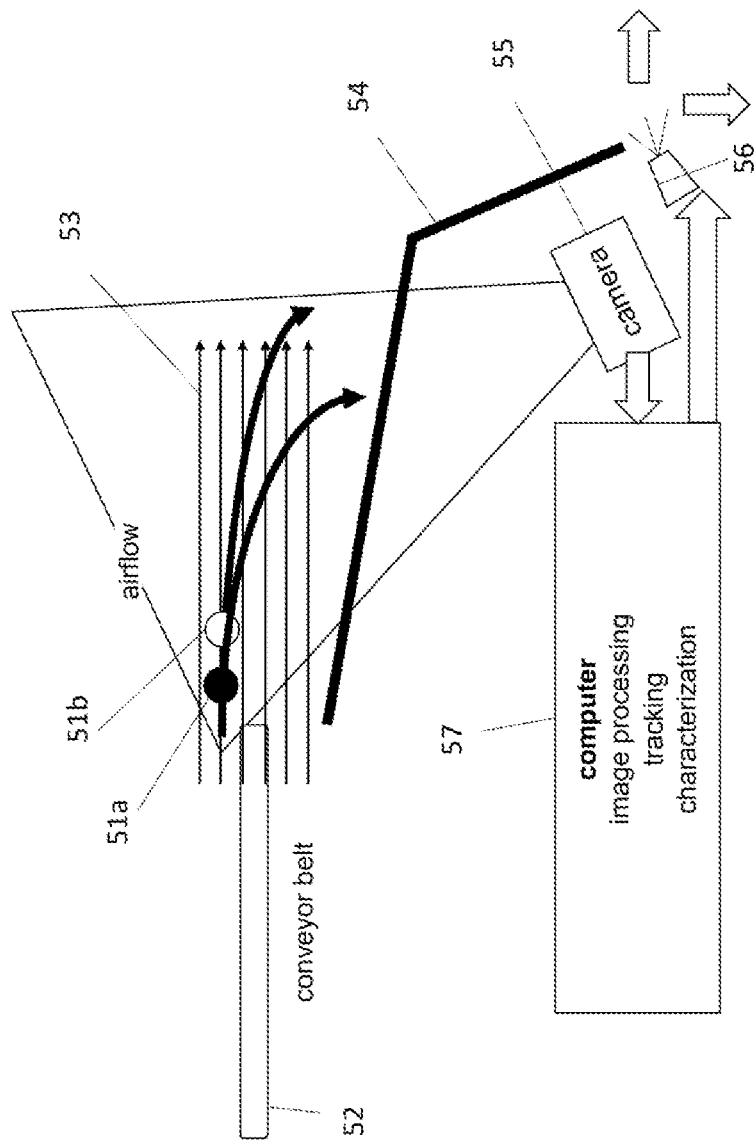
Figure 6:
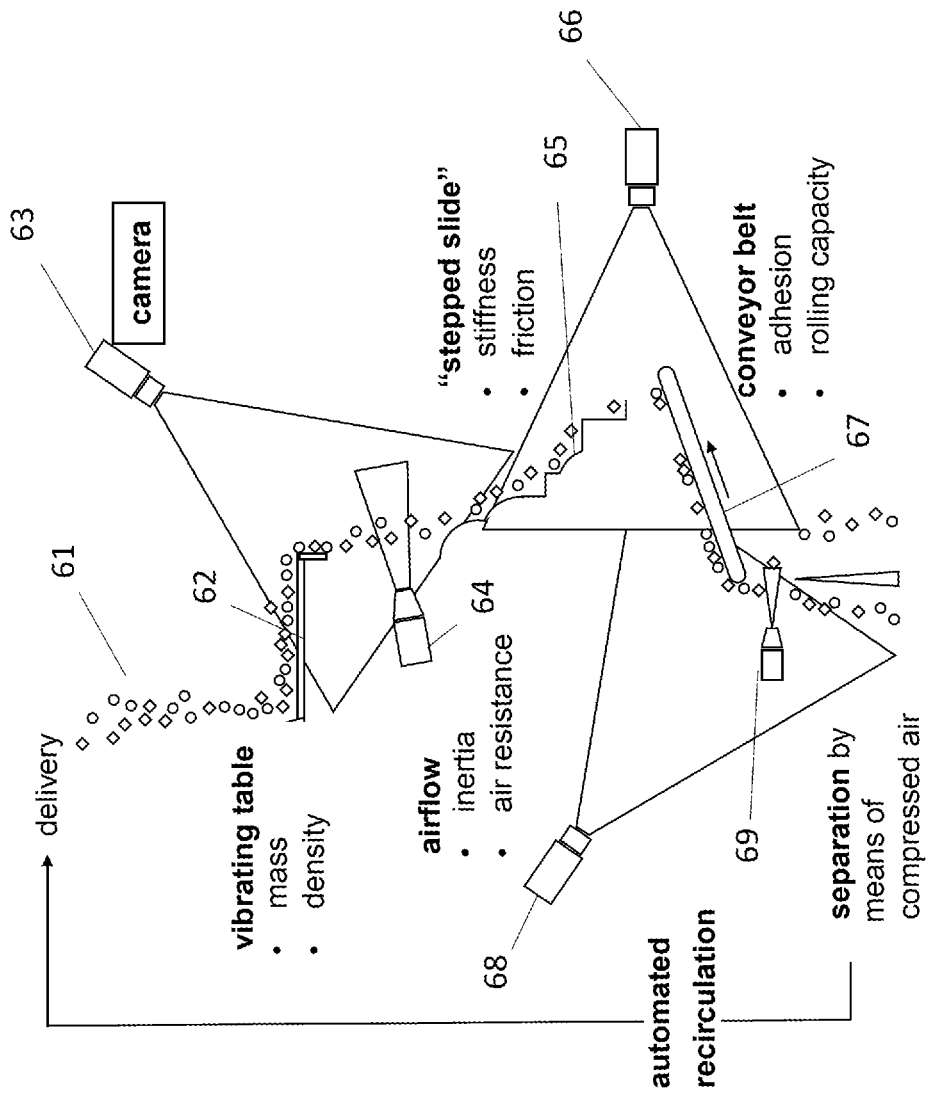
Figure 7:
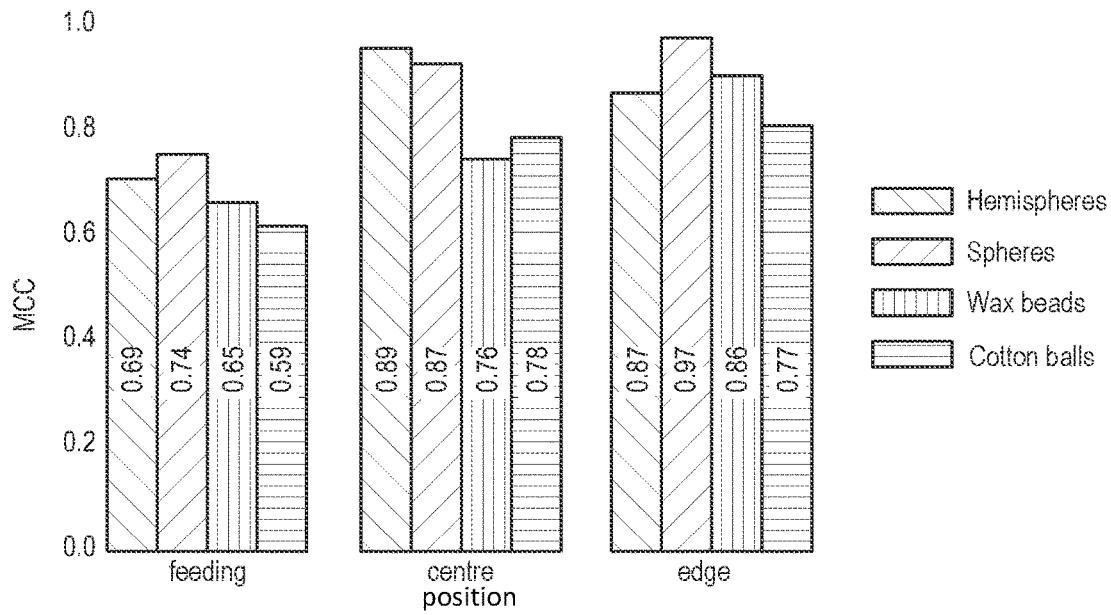
Figure 8:
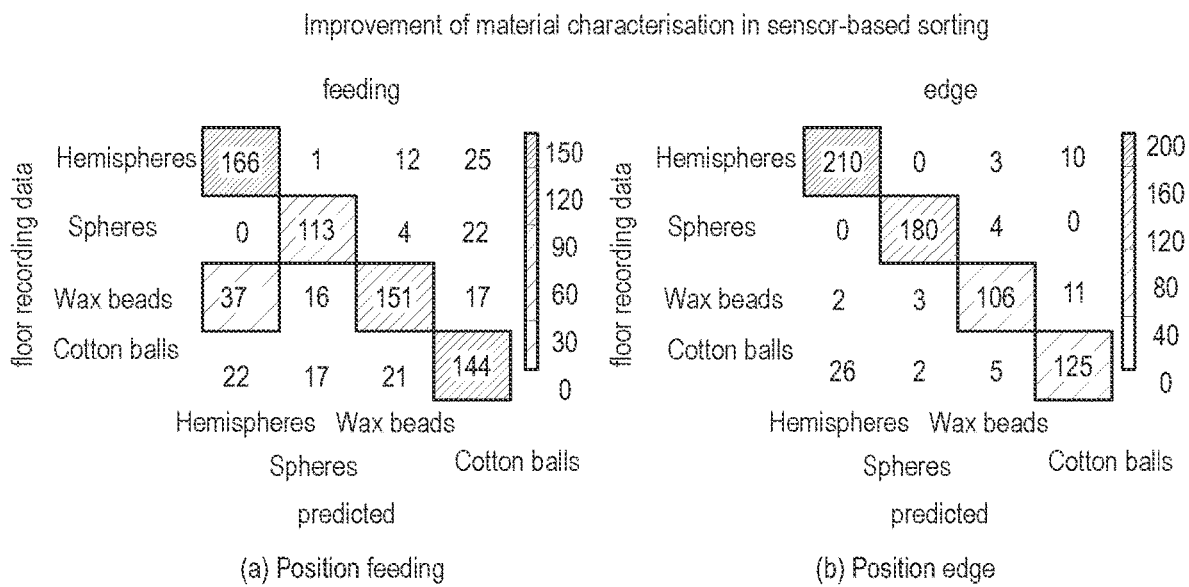

In the figures:

FIG. 1 shows a flow chart of an exemplary sequence of a method according to the invention, FIG. 2 shows a schematic illustration of an exemplary sequence of a method according to the invention, FIG. 3 shows an exemplary embodiment of the method according to the invention for bulk material sorting, FIG. 4 shows an exemplary embodiment of the invention for sorting plastic mixtures for recycling applications, FIG. 5 shows an exemplary embodiment of the method according to the invention for recognizing air inclusions in moulded parts, FIG. 6 shows an exemplary embodiment of the method according to the invention having a variety of interactions, FIG. 7 shows a performance of an exemplary method according to the invention and FIG. 8 shows a representation of the accuracy of this example of the method according to the invention.

FIG. 1 shows a flow chart of an exemplary embodiment of a method according to the invention for determining at least one mechanical property of at least one object. In this case, in a step S1, firstly at least one object is transported 2 past an interaction 1. In step 2, the at least one object is subjected to the at least one interaction 1, wherein the interaction 1 influences a movement state of the at least one object. The interaction 1 is selected here so that the movement state influenced by the interaction is a function of the at least one mechanical property which is to be determined. In a step S2, the at least one object is observed using at least one camera, the images of which are subjected to image processing in a step S3. The at least one object is tracked or followed in the images of the camera in a step S4, so that a movement state of the at least one object is determinable. In a step S5, at least one mechanical property of the at least one object is then determined from the movement state thus determined. In a downstream step S6, the objects can be separated using different properties with the aid of the camera images determined in step S2 and supplied to different fractions.

The excitation 1 can preferably be an interaction which causes a change of the movement state of the at least one object. In the sensorial acquisition S2, a location, a trajectory, a velocity and/or an acceleration of the corresponding object can advantageously be determined as a movement state of the at least one object, which can also be determined as average velocities or average accelerations, maximum velocities, minimum velocities, maximum accelerations and/or minimum accelerations within the observation periods of time.

The sensorial acquisition in step S2 can be performed by means of one or also by means of multiple cameras at the same or at different points in time.

FIG. 2 schematically shows an exemplary sequence of the method according to the invention in comparison to a conventional method. The conventional method is shown here in the upper half and a method according to the present invention is shown in the lower half. It proceeds from a test object 21, which is subjected to an experimental observation situation 22. In particular, an application by means of an interaction which influences a movement state of the at least one object 21 takes place here. A plurality of images 23a, 23b, 23c are recorded of the observation situation, which depict the movement of the object 21. A trajectory 24 of the object can be ascertained from these images. The images thus ascertained can be used to train a neural network 25 if the mechanical property of the object 21 is known. In the subsequent ascertainment step, images 23a, 23b, 23c and/or ascertained trajectories 24 can then be supplied to a trained neural network 25, from which the latter can determine at least one mechanical property. The at least one mechanical property 26 can be, for example, a density, elasticity or friction of the object at a medium.

In the following examples, an excitation and interaction can take place, for example, with a vibrating table, an airflow, a collision with obstructions (for example "stepped slide", rebound plate), with a surface (for example slide which is sandblasted, brushed, coated, etc.), with a conveyor belt, etc.

Image processing can comprise, e.g., preprocessing/image correction (shading, filtering), segmenting (colour LUT, thresholding), localization (context analysis), feature computation (area, centre of gravity, length, width, colour histogram, texture, extension, etc.). Tracking can be carried out, for example, based on centres of gravity (cf. multi-object tracking) and/or based on extension (cf. extended object tracking).

A characterization can be, for example, a classification on the basis of time series, sequential learning, recurrent (deep) artificial neural networks, hidden Markov models, Fourier transforms, dynamic time warping, etc.

A characterization can be performed as follows, for example:

Recording of an image sequence $B_t(x,y)$
Segmenting of the images (objects/background): $B_t(x,y) \in [0, \ldots, 255] \rightarrow F_t(x,y) \in [0,1]$
Recognizing of objects by context analysis in $F_t$. Each image contains n objects.
An object is observed at multiple points in time t.
Every observation of an object is described by a feature vector $f_t$.
$f_t$ contains, inter alia, information on the position of the object. The trajectory of the object can be reconstructed over the time series at positions.
For the final characterization, methods of machine learning can be used, which work with time series (of variable length).

FIG. 3 shows an exemplary design of the method according to the invention for bulk material sorting. For example, empty walnut shells can be discovered between nuts here. Empty shells can be transferred out of a material flow via compressed air valves 31. In this case, objects 33 which form the bulk material are vibrated on a vibrating table 34 in the field of view of a first camera 32a, so that they move onto a first conveyor belt 35a, which conveys at a first velocity $v_1$. The camera 32a records images of the bulk material in the region of the vibrating table 34 and the conveyor belt 35a and relays them to a processing electronics unit 36, which can execute image processing, tracking and characterization. The objects of the bulk material 33 experience an acceleration, which is determinable in the images of the first camera 32a, during the transition from the vibrating table 34 to the first conveyor belt 35a. During the conveyance on the first conveyor belt 35a, the objects of the bulk material 33 move at constant velocity. The objects 33 are then transferred in the field of view of a second camera 32b to a second conveyor belt 35b, which moves at a second velocity $v_2$, which is less than the velocity $v_1$. The objects 33 therefore experience a deceleration during the transition to the second conveyor belt 35b, which is observable in images recorded by the second camera 32b. The second camera 32b supplies its images to the evaluation electronics unit 36, which can in particular associate the objects recorded by the first camera 32a with the objects recorded by the second camera 32b by means of tracking. The processing electronics unit 36 can decide on the basis of the mechanical properties thus ascertained of the objects 33 whether they are nuts or empty shells. The processing electronics unit 36 can then control the compressed air nozzle 31 so that it supplies the empty shells to a different fraction than nuts.

Especially the mass and inertia of the objects 33, which are expressed in the mentioned accelerations and decelerations, are suitable here as mechanical properties, with the aid of which the empty shells are recognizable. The setup shown therefore contains components, with the conveyor belts 35a and 35b, which accelerate and decelerate the nuts.

The cameras 32a and 32b are preferably high-speed cameras. The observation region of the first camera 32a extends in the example shown over the vibration table 34 up to the first conveyor belt 35a and the observation region of the second camera 32b extends from the transition between the conveyor belts 35a and 35b up to the end of the conveyor belt 35b. The observation regions of the two conveyor belts 32a, 32b are advantageously overlapping to be able to track the objects 33. Due to the use of colour cameras 32a, 32b, if needed spots on the shell can also be recognized and used as a further classification criterion.

Image segmenting methods, such as for example colour histograms, difference images or the like, can be used for detecting the individual nuts 33 contained in the material flow. An object can also be described, for example, by one or more geometric features, such as for example centre point 2W projection, a surrounding rectangle, and/or an area.

Tracking algorithms can be used to reveal the correspondences of the individual objects 33 at different observation points in time (cf. multi-object tracking, extended object tracking).

To teach the characteristic sequences, firstly a large training set for normal nuts and separately for empty nuts 33 is created with the aid of feedback. The classification algorithm is trained on the basis of these data.

The classification of the individual nuts 33 is performed on the basis of a sequence of observation points in the form of a set of centres of gravity/surrounding rectangles/area coordinates/etc. Algorithms from the thematic field of sequential learning can be used for this purpose, for example recurrent neural networks. Corresponding classification algorithms enable decisions to be derived not on the basis of a single observation, but rather a history (in the case of RNN by cycles at neurons). The history in this case includes information about the movement of the nut at the various positions.

FIG. 4 shows a further exemplary embodiment of a method according to the invention, which is used for sorting plastic mixtures for recycling applications. In this case, a variety of objects are firstly applied to a vibrating table 41. This vibrates and thus moves the objects onto a slide, which can be Teflon-coated, for example. The objects are accelerated there in the gravitational field of the Earth and strike against a rebound plate 43 at the end of the slide 42, from which they rebound. The objects are observed in the region of the rebound plate 43 by means of a first camera 44a and a second camera 44b, so that the movement thereof may be ascertained after the rebound on the rebound plate 43. An electronic evaluation unit 45, a computer here, executes image processing of the images recorded by the cameras 44a and 44b and tracks the objects. The objects can be characterized on the basis of the different trajectories of the objects after the impact on the rebound plate 43.

The objects sorted here can be, for example, mixtures arising in the context of a recycling process of low-density polyethylene (LDPE) and high-density polyethylene (HDPE) in unknown mixing ratio. The corresponding proportions can be determined by means of the example shown for recycling.

LDPE and HDPE differ, inter alia, in modulus of elasticity and in the coefficient of reconstitution thereof. In the example shown in FIG. 4, these objects are therefore guided onto the rebound plate 43, which can be a steel plate, for example, where they rebound. The cameras 44a and 44b can be, for example, monochromatic high-speed area scan cameras. In this case, the camera 44a acquires the procedure from the bird's-eye view perspective and the camera 44b from the side, i.e. camera 44b views essentially in the direction parallel to the surface of the rebound plate 43. The image processing and the tracking can be designed as described in Example 1.

In the example shown in FIG. 4, the classification can particularly advantageously be implemented by means of machine learning. To teach the system, reference bodies made of plastic having known modulus of elasticity and/or known coefficient of reconstitution can be passed through the system. The trajectories of the objects in the observation regions of the cameras 44a and 44b can then be acquired, in that the images are segmented and the objects are recognized, wherein chronological correspondences between the recordings can be produced by means of multitarget tracking methods. An area of the object, an angle of the main axis and/or an extension can advantageously be determined as an additional geometrical property. The neural network can be trained on the basis of the trajectories and the mention geometrical properties, wherein a model is used which has the modulus of elasticity and the coefficient of reconstitution of the corresponding object as the target variables.

After the teaching phase, the plastic particles to be evaluated can then be guided through the system. The model enables a prediction of the modulus of elasticity and the coefficient of reconstitution on the basis of the observations by the cameras 44a and 44b and thus enables the determination of the proportions of LDPE and HDPE.

FIG. 5 shows a further example of a method according to the invention which is used for recognizing air inclusions in moulded parts. In this case, objects 51a and 51b are moved on a conveyor belt 52. The objects 51a, 51b are introduced by the conveyor belt 52 into the influence region of an airflow 53. The objects 51a and 51b are falling in the region of the airflow 53. If one of the objects 51a or 51b has air inclusions, the object thus has a lower mean density. If the moulded parts 51a, 51b have uniform volume, the weight of a moulded part 51a, 51b having air inclusions is therefore less than without air inclusions. The corresponding moulded part 51a therefore sinks more slowly in the airflow in the flight phase. The flight of the moulded parts 51a and 51b is observed in the example shown using a high-speed area scan camera 55, the viewing direction of which is perpendicular to the flight direction of the objects 51a, 51b. The camera 55 can be a monochromatic high-speed area scan camera.

The images recorded by the camera 55 are supplied to a processing electronics unit 57, which executes image processing and tracking of the objects. With the aid of the observed trajectories of the objects 51a and 51b, the latter can be characterized, in particular with respect to the presence of air inclusions. The objects 51a, 51b can fall onto a slide 54 after the freefall thereof in the airflow 53, by means of which they are moved into the influence region of a compressed air nozzle 56. This nozzle can supply the objects 51a, 51b to different fractions in dependence on the ascertained property, i.e. in dependence on the presence of air inclusions.

The example shown in FIG. 5 can also advantageously be implemented by means of machine learning. To teach the system, in this case image data can be recorded using reference bodies, i.e. using moulded parts with and without air inclusions, wherein it is known which of the moulded parts have air inclusions and which do not. The observables which describe the deflection during the flight phase can then be recorded. The classifier can be trained using this database. The sequences with respect to the image processing and the tracking advantageously correspond here to those of the preceding examples. The objects can then be characterized by means of the trained neural network as in the preceding examples.

FIG. 6 shows an example of a method according to the invention in which multiple mechanical properties are determined from multiple interactions. A bulk material object 61 is firstly applied to a vibrating table 62 here, which supplies the objects 61 to a freefall, which is observed by a camera 63. The particles move on the vibrating table 63 differently in dependence on the mass and the density thereof. The mass and the density can therefore be concluded by observation by means of the camera 63. In the region of the freefall, an airflow can be applied to the objects 61 by means of an air nozzle 64, to which the particles 61 react differently in dependence on the inertia and the air resistance thereof. Therefore, the inertia and the air resistance of the particles 61 can be concluded by the observation in the region of the airflow of the nozzle 64. The objects 61 can then be supplied to a stepped slide 65.

They can also be observed by means of the camera 63 and/or by means of a further camera 66 in the region of the stepped slide. The particles 61 move differently on the stepped slide 65 in dependence on the stiffness and friction thereof.

Therefore, the stiffness and friction of the particles 61 can be concluded by observation of the particles in the region of the stepped slide 65 by means of one of the cameras or both cameras 63 and 66.

The particles 61 can then fall onto a conveyor belt 67, on which they are observed by a further camera 68. The particles move on the conveyor belt in dependence on the adhesion and the rolling capacity thereof. The particles can therefore be studied with respect to the adhesion and the rolling capacity thereof from the observation by means of the camera 68 on the conveyor belt 67.

Finally, the particles can optionally be supplied to different fractions. This can be performed, for example, by means of a compressed air nozzle 69.

An exemplary embodiment of a method according to the invention is to be described hereafter. In this case, the objects are to be moved by means of a conveyor belt along the movement direction of the conveyor belt. Each of the objects is observed here multiple times by at least one camera to obtain data which can be used to characterize the objects. For example, an area scan camera can be used which has a sufficiently high frame rate.

Positions of the object, for example centres of gravity of the 2D projection, can be determined from the image data recorded by the camera. A set of points for each image results therefrom. By using multi-target tracking, items of information about the same object in successive images can be combined into a trajectory. For example, a normal Kalman filter can be used for state determination, in particular for determining the 2D position and the velocity in both directional components as state variables. An algorithm for solving the "linear assignment problem" can also be used for the association between obtained measurements and existing trajectories. A detailed description of this system is found, for example, in F. Pfaff, C. Pieper, G. Maier, B. Noack, H. Kruggel-Emden, R. Gruna, U. D. Hanebeck, S. Wirtz, V. Scherer, T. Längle et al., "Improving optical sorting of bulk materials using sophisticated motion models", tm-Technisches Messen, Vol. 83, No. 2, pp. 77-84, 2016
and
F. Pfaff, M. Baum, B. Noack, U. D. Hanebeck, R. Gruna, T. Langle, and J. Beyerer, "TrackSort: Predictive tracking for sorting uncooperative bulk materials", in 2015 IEEE International Conference on Multisensor Fusion and Integration for Intelligent Systems (MFI), 2015, pp. 7-12.

Finally, the path of each individual object can therefore be described by a list of centre-of-gravity measurements. However, these can differ in the length thereof due to different numbers of observation points in time of the objects.

In this example, several movement-related values can be manually selected based on velocities and accelerations. One chronologically global and multiple chronologically local features can be considered with respect to the velocity. In this context, global features refer to items of information which were obtained over the entire observation sequence of the object. Local features can be based on two successive measurements for velocity-related features and three successive measurements for acceleration-related features. The finally resulting feature vector is 14-dimensional and is composed of the following numeric values: the number of obtained measurements, the global velocity of the object, the local minimum, average and maximum velocity individually for the X and the Y component, and the local minimum, average and maximum acceleration individually for the X and Y component.

It is to be noted that the local features, which are in the majority, may be computed in-line with the observations, while the global features require that it be established that the object has left the observable region.

The described approach was experimentally validated. Four products were selected for this purpose, for which similar but not identical movement characteristics are to be expected. Such products can be, for example, wooden hemispheres, wooden spheres, wax beads and cotton balls. These objects all had a diameter of 10 mm and only differed with respect to the surface friction and the weight thereof. In addition to the different materials, the wax beads and the cotton balls had a small hole through them. The wooden hemispheres had a mass of approximately 0.26 g, the wooden spheres of approximately 0.4 g, the wax beads had a mass of approximately 0.47 g, and the cotton balls a mass of approximately 0.24 g.

Image data were recorded for these objects using a miniaturized optical belt sorter. A detailed embodiment of the system is described in C. Pieper, G. Maier, F. Pfaff, H. Kruggel-Emden, S. Wirtz, R. Gruna, B. Noack, V. Scherer, T. Längle, J. Beyerer et al., "Numerical modelling of an automated optical belt sorter using the discrete element method", Powder Technology, 2016.

The objects were introduced into the system by means of a vibration feeder and then slid down an incline to a conveyor belt, which moved at a velocity of 1.1 m/s. The images were recorded at a frequency of approximately 192 Hz using a camera of the type "Bonito CL-400". The conveyor belt had a total length of 60 cm. One important parameter for the flow control is the length of the conveyor belt. Therefore, different lengths were imitated in that the camera was attached at different positions along the conveyor belt at fixed intervals. Data were recorded for three locations, which are described hereafter. The first section, which is to be referred to here as the feeding, is arranged directly behind the location where the objects reach the conveyor belt and comprised the first approximately 11 cm. This location of the camera thus simulated the shortest length of the conveyor belt. The second section is arranged in the middle of the conveyor belt and covers a region of approximately 23 cm-34 cm and is to be described here as the centre. The last region covered the last approximately 8 cm of the conveyor belt and is to be described here as the edge.

Each of the following processing steps was executed off-line following the image recording. Firstly, fundamental image processing routines were used to extract centre points of objects potentially contained in each frame. The fact was utilized here that a stable background and a stable illumination existed in the scene. A background subtraction approach was used to extract regions of the frame which contain objects. The centre points thereof were then computed. This centre-of-gravity information was then supplied to the multitarget tracking system, which outputs a list of tracks and associated measurements for each data set. The above-described feature vectors could then be computed from these data.

Since manual feature selection was executed here, Principle Component Analysis (PCA) was used to validate the selection. Clusters could be identified for all four of the classes.

A Random Forrest Classifier having 10 estimators was trained on the data to show the success of the method. The Matthews Correlation Coefficient (MCC) was used as a measure of the quality, as described in B. W. Matthews, "Comparison of the predicted and observed secondary structure of T4 phage lysozyme", Biochimica et Biophysica Acta (BBA)-Protein Structure, Vol. 405, No. 2, pp. 442-451, 1975. Firstly, all of the data were used, both for training and also for testing, to obtain an upper limit of the performance. Excellent values between 0.98 and 1.0 were obtained for all observation regions and classes. It is clearly apparent here that classes can be differentiated with the aid of the data.

In addition, training and testing were executed by means of cross validation. For this purpose, 60% of the data were used for the training. The results obtained in this way are shown in FIG. 7(b). It is apparent that in general the wooden spheres and hemispheres could be detected with greatest accuracy for all observed camera positions. It is also apparent that the classification quality improves with the length of the conveyor belt. It has been shown that movement-based features are informative for differentiating products. An optional combination with further features, such as for example colour-based features or geometrical features, can further improve the results.

FIG. 8 shows which errors resulted in the classification. It can be recognized, for example, in the truth matrices shown in FIG. 8 that in the position "feeding", many wax beads were incorrectly classified as wooden hemispheres, while these errors almost completely disappeared in the position "edge". On the other hand, it can be seen that the number of cotton balls incorrectly recognized as wooden hemispheres is almost equal at both positions.

The invention shows that movement-based features are well suited for differentiating specific products in the sensor-based sorting. For further improvement, for example, changes in direction and rotational momentum can also be used.

The operations described in the method claims herein can be performed by a device, such as the computer or electronics unit, described herein, for example, such as a device that can perform one or more aspects of the methods described or claimed herein including by using the device to execute instructions such as can be stored on a non-transitory or other computer readable medium.

The invention claimed is:

1. A method for determining at least one mechanical property of at least one object, the method comprising:
subjecting the at least one object to at least one interaction which influences a movement state of the at least one object, wherein the at least one interaction is selected such that the movement state effectuated by the interaction is a function of the at least one mechanical property;
observing the at least one object using at least one camera, wherein the at least one object is recorded multiple times at different times by the at least one camera; and
determining the movement state from images recorded by the at least one camera, wherein the at least one mechanical property of the at least one object is determined from the movement state thus determined;
wherein for the at least one object the movement state is determined from at least one of an average velocity or an average acceleration of the at least one object, wherein at least one of the average velocity of the at least one object is averaged over a maximum period of time which the object is visible in the at least one recorded image or the average acceleration of the at least one object is averaged over a maximum period of time which the at least one object is visible in the at least one recorded image.

2. The method according to claim 1, wherein at least one interaction with the object is generated, which effectuates a change of a movement state of the at least one object.

3. The method according to claim 1, wherein the at least one object is recorded using at least two cameras from different directions.

4. The method according to claim 1, wherein the at least one object is recorded using a first camera at a first point in time and using a second camera at a second point in time, which is different from the first.

5. The method according to claim 1, wherein for the at least one object the movement state is further respectively determined as a set containing one or more selected from:
a minimum velocity in the period of time which the respective object is visible in the at least one recorded image;
at least one of a maximum velocity in the period of time which the respective object is visible in the at least one recorded image, or an average velocity over a part of the period of time in which the at least one object is visible in the at least one recorded image;
a minimum acceleration in the period of time which the at least one object is visible in the at least one recorded image; and
at least one of a maximum acceleration in the period of time which the at least one object is visible in the at least one recorded image or an average acceleration over a part of the period of time in which the at least one object is visible in the at least one recorded image.

6. The method according to claim 1, wherein the interaction comprises at least one of an application of vibration of at least one impact, an interaction with a contact surface, or an interaction with an airflow.

7. The method according to claim 1, wherein the at least one object, for the subjection to the at least one interaction, is at least one of vibrated using a vibrating table, translated on a slide or a stepped slide or a sandblasted, brushed or coated slide, or is moved using a conveyor belt.

8. The method according to claim 1, wherein the at least one mechanical property comprises at least one of an inertia, a mass, a density, a friction with a surrounding medium, a rolling capacity, an adhesion, a stiffness, a modulus of elasticity, a coefficient of reconstitution, or a flow resistance of the object.

9. The method according to claim 1, wherein the images are subjected to at least one of:
image processing, image correction, segmentation, localization, or feature computation, to determine the movement.

10. The method according to claim 1, wherein at least one mechanical property is determined jointly of a plurality of objects.

11. The method according to claim 1, wherein at least a portion of the at least one object is identified and tracked in different ones of the images, wherein the tracking is preferably performed using at least one of:
multi object tracking or extended object tracking.

12. The method according to claim 11, wherein the movement of the objects at least one object is described by a list of at least one center-of-gravity measurement.

13. The method according to claim 1, wherein the movement is ascertained from the images recorded by the at least one camera using a neural network, wherein firstly the neural network is trained using a set of objects having known properties, and subsequently the at least one property of the at least one object detected in the images are determined using the neural network.

14. The method according to claim 10, wherein the at least one object is classified with the aid of the at least one mechanical property.

15. The method according to claim 1, wherein at least one geometrical property of the at least one object is determined.

16. The method according to claim 1, wherein the method is utilized for at least one of measurement or classification in at least one of:
   an industrial test, an inspection for bulk goods sorting, or for piece goods testing.

17. A device for determining at least one mechanical property of at least one object, comprising:
   at least one interaction device for subjecting the at least one object to an interaction which influences a movement state of the object;
   at least one camera, using which the at least one object is observable, wherein the at least one object is recorded multiple times at different times by the at least one camera; and
   at least one analysis unit, using which the at least one mechanical property of the at least one object is determinable from images recorded by the camera, wherein the at least one mechanical property is determined from a movement state of the at least one object determined from images recorded by the at least one camera, and wherein for the at least one object the movement state is determined from at least one of an average velocity or an average acceleration of the at least one object, wherein at least one of the average velocity of the at least one object is averaged over a maximum period of time which the object is visible in the recorded images or the average acceleration of the at least one object is averaged over a maximum period of time which the at least one object is visible in the recorded images.

* * * * *